US011228422B2

(12) United States Patent
Gori et al.

(10) Patent No.: US 11,228,422 B2
(45) Date of Patent: *Jan. 18, 2022

(54) CONFIGURING A DEVICE BASED ON A DPA COUNTERMEASURE

(71) Applicant: Cryptography Research, Inc., Sunnyvale, CA (US)

(72) Inventors: Christopher Gori, San Francisco, CA (US); Pankaj Rohatgi, Los Altos, CA (US)

(73) Assignee: Cryptography Research, Inc., San Jose, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 16/734,296

(22) Filed: Jan. 3, 2020

(65) Prior Publication Data
US 2020/0228306 A1    Jul. 16, 2020

Related U.S. Application Data

(63) Continuation of application No. 15/135,024, filed on Apr. 21, 2016, now Pat. No. 10,530,566.

(60) Provisional application No. 62/151,931, filed on Apr. 23, 2015.

(51) Int. Cl.
*H04L 9/00* (2006.01)
*G06F 21/75* (2013.01)
*G09C 1/00* (2006.01)

(52) U.S. Cl.
CPC ............ *H04L 9/003* (2013.01); *G06F 21/755* (2017.08); *G09C 1/00* (2013.01); *H04L 2209/08* (2013.01)

(58) Field of Classification Search
CPC ..... H04L 9/003; H04L 2209/08; G06F 21/558; G06F 21/75; G06F 21/755; G09C 1/00
See application file for complete search history.

(56) References Cited

U.S. PATENT DOCUMENTS

| 7,587,044 | B2 | 9/2009 | Kocher et al. | |
|---|---|---|---|---|
| 8,370,642 | B2 | 2/2013 | Nobukata | |
| 8,804,949 | B2 | 8/2014 | Fontana et al. | |
| 9,135,453 | B2 | 9/2015 | Shen-Orr et al. | |
| 2004/0091107 | A1* | 5/2004 | Fujisaki | H04L 9/003 380/42 |
| 2005/0002523 | A1 | 1/2005 | Sonnekalb | |
| 2005/0108498 | A1 | 5/2005 | Kaminaga et al. | |
| 2005/0273630 | A1 | 12/2005 | Shu et al. | |
| 2007/0076864 | A1 | 4/2007 | Hwang | |

(Continued)

OTHER PUBLICATIONS

J. Kaps and R. Velegalati, "DPA Resistant AES on FPGA Using Partial DDL," 2010 18th IEEE Annual International Symposium on Field-Programmable Custom Computing Machines, 2010, pp. 273-280, doi: 10.1109/FCCM.2010.49. (Year: 2010).*

(Continued)

*Primary Examiner* — Robert B Leung
*Assistant Examiner* — Sameera Wickramasuriya
(74) *Attorney, Agent, or Firm* — Lowenstein Sandler LLP

(57) ABSTRACT

Input signals may be received. Furthermore, a control signal controlling the implementation of a Differential Power Analysis (DPA) countermeasure may be received. One of the input signals may be transmitted as an output signal based on the control signal. A cryptographic operation may be performed based on the first output signal that is transmitted based on the control signal.

20 Claims, 7 Drawing Sheets

(56) References Cited

U.S. PATENT DOCUMENTS

| | | | |
|---|---|---|---|
| 2008/0189555 | A1 | 8/2008 | Sohn |
| 2010/0166177 | A1 | 7/2010 | Sirio et al. |
| 2011/0091034 | A1* | 4/2011 | Teglia ............... H04L 9/003 380/29 |
| 2011/0200190 | A1* | 8/2011 | Hisakado ........... H04L 9/003 380/46 |
| 2012/0045061 | A1* | 2/2012 | Danger .............. H04L 9/003 380/277 |
| 2012/0087489 | A1* | 4/2012 | Sekiya ............... H04L 9/003 380/28 |
| 2012/0144205 | A1 | 6/2012 | Shu et al. |
| 2012/0159187 | A1 | 6/2012 | Liu et al. |
| 2014/0143883 | A1* | 5/2014 | Shen-Orr ........... G06F 21/60 726/26 |
| 2015/0365228 | A1 | 12/2015 | Belenky |
| 2017/0026169 | A1* | 1/2017 | Sugahara ........... G09C 1/00 |

OTHER PUBLICATIONS

N. Pramstaller, F. K. Gurkaynak, S. Haene, H. Kaeslin, N. Felber and W. Fichtner, "Towards an AES crypto-chip resistant to differential power analysis," Proceedings of the 30th European Solid-State Circuits Conference, 2004, pp. 307-310, doi: 10.1109/ESSCIR. 2004.1356679. (Year: 2004).*

Lang Lin and W. Burleson, "Leakage-based differential power analysis (LDPA) on sub-90nm CMOS cryptosystems," 2008 IEEE International Symposium on Circuits and Systems, 2008, pp. 252-255, doi: 10.1109/ISCAS.2008.4541402. (Year: 2008).*

Bucci, Marco, "A Power Consumption Randomization Countermeasure for DPA-Resistant Cryptographic Processors", Proceedings of the 14th International Workshop, PATMOS 2004, Lecture Notes in Computer Science, vol. 3254, pp. 481-490, Sep. 15-17, 2004. 10 pages.

Jungk, B. et al., "Side-Channel Resistant AES Architecture Utilizing Randomized Composite Field Representations", 2012 International Conference on Field-Programmable Technology, IEEE 2012, pp. 125-128. 4 Pages.

Liu, Po-Chun et al., "A True Random-Based Differential Power Analysis Countermeasure Circuit for an AES Engine", IEEE Transactions on Circuits and Systems II: Express Briefs, vol. 59, No. 2, Feb. 2012, pp. 103-107. 5 Pages.

Muresan, Radu et al., "Protection Circuit Against Differential Power Analysis Attacks for Smart Cards", IEEE Transactions on Computers, vol. 57, No. 11, Nov. 2008, pp. 1540-1549. 10 Pages.

* cited by examiner

CONFIGURING A DEVICE BASED ON A DPA COUNTERMEASURE

RELATED APPLICATION

This application is a continuation application of co-pending U.S. patent application Ser. No. 15/135,024 filed Apr. 21, 2016, claims the benefit under 35 U.S.C. § 119(e) of U.S. Provisional Application No. 62/151,931 filed on Apr. 23, 2015, which is hereby incorporated by reference.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
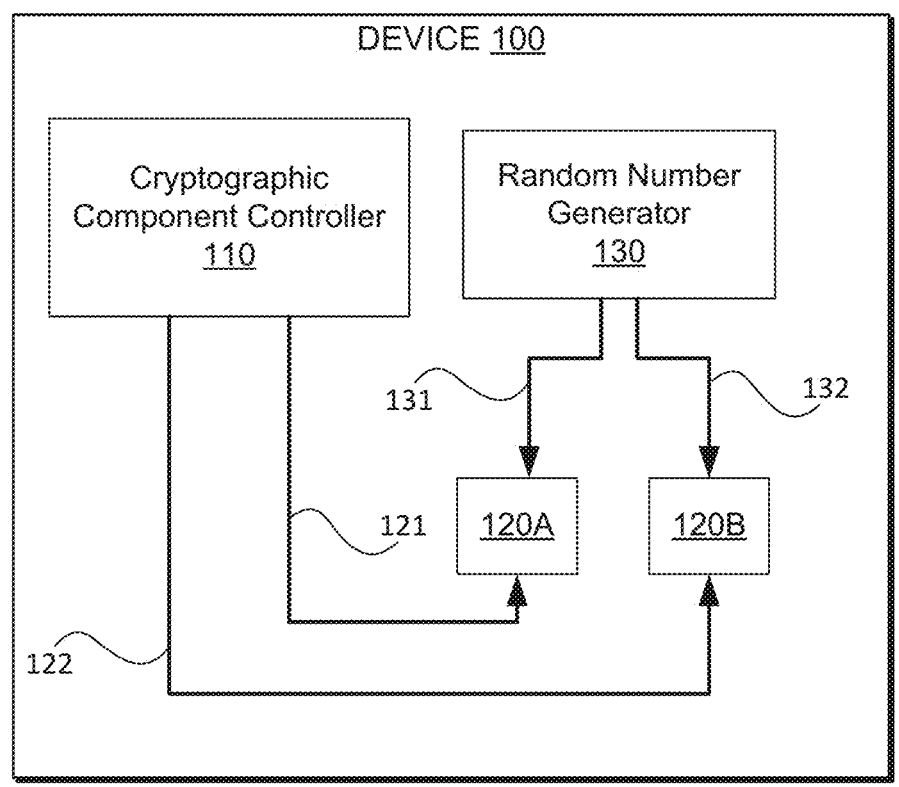
FIG. 1 illustrates an example device with configurable cryptographic components in accordance with some embodiments.

Aspects of the present disclosure are directed to configuring a device based on a differential power analysis (DPA) countermeasure requirement. A device, such as a system on a chip (SoC) or another type of integrated circuit, may include multiple cryptographic components that are each capable of performing a cryptographic operation. The SoC may perform various cryptographic operations where each of the cryptographic operations use a different cryptographic component to perform the cryptographic operation. For example, a first cryptographic operation performed by the SoC may utilize a first cryptographic component and a second cryptographic operation that is performed by the SoC may utilize a second cryptographic component of the SoC.

A cryptographic operation performed by an integrated circuit may require protection against a side channel attack where an attacker of an integrated circuit (e.g., the SoC) may obtain a secret value or key that is used during the performance of the cryptographic operation. An example of such a side channel attack includes, but is not limited to, a DPA attack that may involve an attacker who seeks to obtain the secret value or key from the integrated circuit may study the power consumption of the integrated circuit as the secret value or key is used in a cryptographic operation. The attacker may be an unauthorized entity that may obtain the secret value or key from the integrated circuit by analyzing power consumption measurements of the integrated circuit over a period of time as the secret value or key is used in the cryptographic operation.

The integrated circuit may provide protection against a DPA attack (i.e., resistance against DPA) by implementing or introducing a countermeasure in the cryptographic operation so that observations of the power consumption measurements of the integrated circuit will not reveal the secret value or key used in the cryptographic operation. An example of such a countermeasure is a random pre-charge (RPC) where random values may be used in the cryptographic operation, thereby leading to random or varying power consumption as the cryptographic operation is performed. The RPC values may be interleaved at various stages of the cryptographic operation. Thus, the interleaving of random values to be used by the cryptographic operation may provide DPA resistance or provide protection from a DPA attack by making the sequence of observed power consumption more difficult to correlate to the secret value or key.

Some implementations of the RPC countermeasure (i.e., a DPA countermeasure) may require additional integrated circuit components or may reduce the performance (e.g., data throughput) of the cryptographic operation. For example, the additional components of the cryptographic component may require duplicated components (e.g., twice as much) to maintain the original performance of the cryptographic components when using the DPA countermeasure.

Providing cryptographic components of an integrated circuit that are configurable based on whether or not a DPA countermeasure is needed for a cryptographic operation may allow for an improved utilization of the cryptographic components. For example, when a cryptographic operation does not require a DPA countermeasure, then the cryptographic component may be configured to operate by not providing any such DPA countermeasure during the cryptographic operation. Such a cryptographic component may then be able to perform the cryptographic operation without the reduced performance or throughput that would result if DPA countermeasures were used. Furthermore, an additional cryptographic operation that does not require DPA countermeasure may also be performed by the same cryptographic component without reduced performance or throughput (e.g., through the duplicated components). However, if the cryptographic operation does require a DPA countermeasure, then the cryptographic component(s) may be configured to provide the DPA countermeasure. In some embodiments, no other cryptographic operation may be performed while a cryptographic component is configured to provide a DPA countermeasure (e.g., the use of the DPA countermeasure requires the duplicated components).

The cryptographic component may include a first path and a second path where each of the first and second paths includes a selection unit (e.g., a multiplexer), a memory element (e.g., a register or a flip-flop), and cryptographic logic that performs a cryptographic operation. For example, the first path may include a first selection unit, a first memory element, and a first cryptographic logic and the second path may include a second selection unit, a second memory element, and a second cryptographic logic. Each selection unit may be coupled to receive input signals corresponding to the output of a random number generator providing an RPC value, the output of the first cryptographic logic, and the output of the second cryptographic logic.

The cryptographic component may be configured to provide a DPA countermeasure by controlling the operation of the selection units. For example, a control signal may be provided to the selection unit to control the selection of an input signal to be output by the selection unit. If the control signal corresponds to an instruction to provide a DPA countermeasure, then the selection units may provide an output by alternating, as an output signal, between the random value provided by the random value generator and the output of the cryptographic logic of the other path. For example, the first selection unit may alternate between outputting the random number and the output of the second cryptographic logic and the second selection unit may alternate between outputting the random number and the output of the first cryptographic logic. However, if the control signal corresponds to an instruction to not provide a DPA countermeasure, then the selection units may output the output of the cryptographic logic in the same path. For example, the first selection unit may provide an output of the first cryptographic logic and the second selection unit may provide an output of the second cryptographic logic.

As such, a cryptographic component may be configured based on whether or not an operation requires a DPA countermeasure. Selection units of the cryptographic component may be configured to provide DPA countermeasures if a DPA countermeasure is required by an operation. A single cryptographic component may be configured to provide a DPA countermeasure for a single cryptographic operation requiring a DPA countermeasure while the same cryptographic component may alternatively perform multiple cryptographic operations if neither operation requires a DPA countermeasure. Thus, for an integrated circuit that utilizes multiple cryptographic components to perform different cryptographic operations, the use of configurable cryptographic components may allow the integrated circuit to flexibly utilize the cryptographic components to meet different requirements (e.g., security requirements relating to DPA countermeasures or performance requirements) of the various cryptographic operations.

FIG. 1 illustrates an example device 100 with configurable cryptographic components. In general, the device 100 may correspond to an integrated circuit such as a system on a chip (SoC). The device 100 may include multiple cryptographic components that may each perform a cryptographic operation with a DPA countermeasure or at least two cryptographic operations without DPA countermeasures.

As shown in FIG. 1, the device 100 may include cryptographic components 120A and 120B. Each of the cryptographic components 120A and 120B may be configurable to perform a cryptographic operation that requires a DPA countermeasure or to perform at least two cryptographic operations that do not require a DPA countermeasure. The cryptographic operations may include, but are not limited to, Advanced Encryption Standard (AES) operations, Data Encryption Standard (DES) operations, Triple Data Encryption Algorithm (TDEA or Triple DEA) operations, another block cipher operation, or other such cryptographic operations. The cryptographic operations may be used as part of another operation or function of the device 100. For example, the cryptographic components 120A-B may be used to perform cryptographic operations for an encoding or decoding operation of the device 100 (e.g., encoding or decoding multimedia content or other data), an encryption or decryption of a message or generation of an authentication code for a message, etc. The cryptographic components 120A-B may each perform part of a cryptographic operation. For example, each component may perform one round of a block cipher (e.g., an AES operation).

The device 100 may further include a cryptographic component controller 110 that may generate a first control signal 121 that may be used to configure the cryptographic component 120A and a second control signal 122 that may be used to configure the cryptographic component 120B. The cryptographic component controller 110 may generate the first control signal 121 or the second control signal 122 based on a type of cryptographic operation that is to be performed. For example, the cryptographic component controller 110 may generate the first control signal 121 at a first value (e.g., '0') when the cryptographic component 120A is to not operate with a DPA countermeasure (e.g., a cryptographic operation without a DPA requirement) and the first control signal 121 may be at a second value (e.g., '1') when the cryptographic component 120A is to operate with a DPA countermeasure (e.g., a cryptographic operations with a DPA requirement).

In operation, the device 100 may perform multiple operations or functions (e.g., encoding or decoding data) that may use the cryptographic components 120A and 120B. For example, the device 100 may perform a first operation, a second operation, and a third operation. The first and second operations may not require a DPA countermeasure and the third operation may require a DPA countermeasure. Thus, the cryptographic component controller 110 may generate the first control signal 121 at a first value corresponding to configuring the cryptographic component 120A without a DPA countermeasure. Furthermore, the cryptographic component controller 110 may generate the second control signal 122 at a second value corresponding to configuring the cryptographic component 120B with a DPA countermeasure. The first and second operations may then each use the cryptographic operations of the cryptographic component 120A while the third operation may solely use the cryptographic operations of the cryptographic component 120B.

At a later time, the first and second operations may be completed and a fourth operation requiring a DPA countermeasure may be performed by the device 100 while the third operation is still being performed. The cryptographic component controller 110 may then change the value of the first control signal 121 from the first value to the second value so that the fourth operation may perform cryptographic operations of the cryptographic component 120A with the DPA countermeasure.

Furthermore, as described in additional detail below, the device 100 may include a random number generator 130 that may generate a random number that is to be used when the cryptographic components 120A or 120B are to provide the DPA countermeasure. In some embodiments, the random number generator 130 may generate a new random number in response to each clock cycle received by the cryptographic components 120A or 120B.

Figure 2:
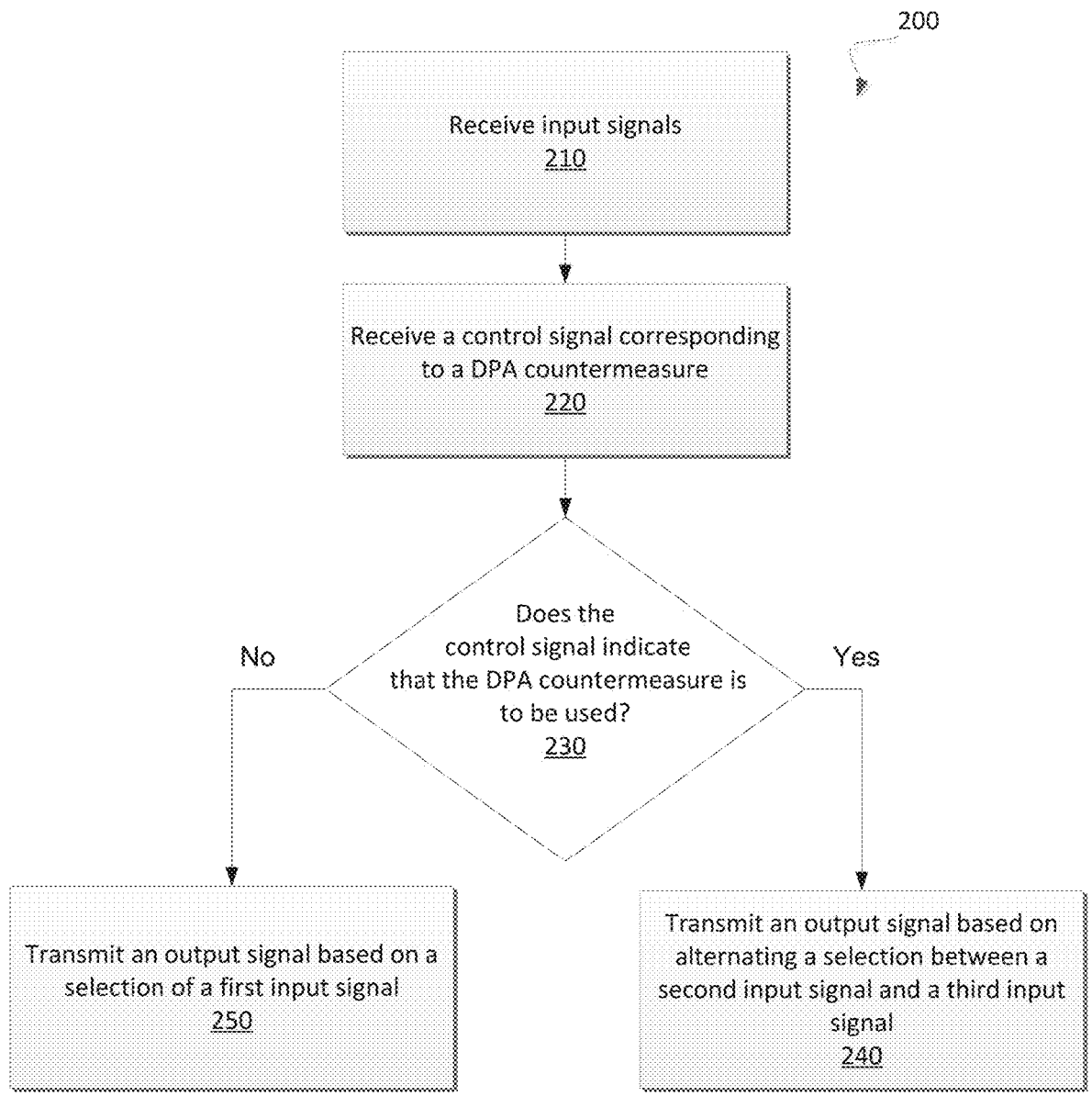
FIG. 2 is a flow diagram of an example method to configure a cryptographic component in accordance with some embodiments of the present disclosure.

FIG. 2 is a flow diagram of an example method 200 to configure a cryptographic component. In general, the method 200 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 may be performed by the cryptographic component 120A or 120B of FIG. 1. For example, the method 200 may be performed by a selection unit of the cryptographic component 120A or 120B based on a control signal from the cryptographic component controller 110.

As shown in FIG. 2, the method 200 may begin with the processing logic receiving input signals (block 210). For example, a selection unit (e.g., a multiplexer) of a cryptographic component may receive a first input signal that is coupled to the output of a first cryptographic logic component that is in a path of the selection unit, a second input signal that is coupled to the output of a second cryptographic logic component that is not in the path of the selection unit, and a third input signal that is coupled to the output of a random number generator component. The processing logic may further receive a control signal corresponding to a DPA countermeasure (block 220). For example, the control signal may indicate whether a DPA countermeasure is to be used or provided or if the DPA countermeasure is not to be used or provided. The control signal may correspond to the enabling, selection, or activation of a DPA countermeasure. The processing logic may further determine whether the control signal indicates that the DPA countermeasure is to be used (block 230). If the control signal indicates that the DPA countermeasure is to be used, then the processing logic may transmit an output signal based on a selection that alternates between at least two of the input signals (block 240). For example, the selection unit may alternate between outputting the second input signal that is coupled to the output of the second cryptographic logic component and the third input signal that is coupled to the output of the random number generator. In some embodiments, the alternating between the second input signal and the third input signal may result in the interleaving of the randomly generated numbers of the third input signal into a cryptographic operation. Such an interleaving of randomly generated numbers may provide DPA resistance and may be referred to as a DPA countermeasure. However, if the control signal indicates that the DPA countermeasure is not to be used, then the processing logic may transmit an output signal based on a selection of the first input signal that corresponds to the first cryptographic logic component (block 250).

As such, a selection unit of a cryptographic component may be configured to provide or not to provide a DPA countermeasure based on a control signal that identifies whether the DPA countermeasure should be provided. The configuration of the cryptographic component may determine inputs of the selection unit that will be transmitted as an output of the selection unit.

Figure 3:
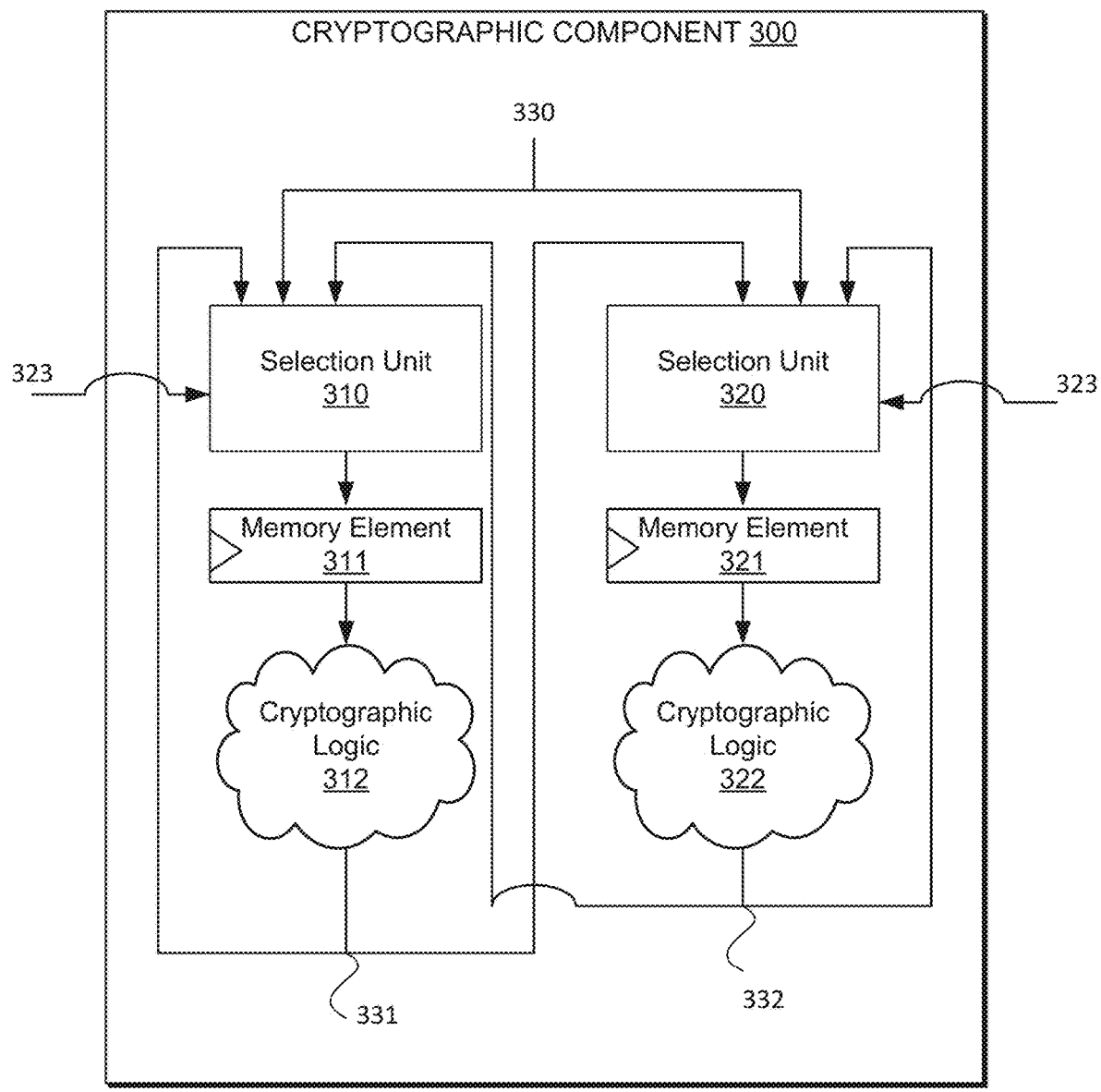
FIG. 3 is a block diagram of an example configurable cryptographic component in accordance with some embodiments.

FIG. 3 is a block diagram of an example cryptographic component 300 in accordance with some embodiments. In general, the cryptographic component 300 may correspond to the cryptographic component 120A or 120B of FIG. 1.

As shown in FIG. 3, the cryptographic component 300 may include a first path or block that includes a selection unit 310, a memory element 311, and a cryptographic logic 312 and the cryptographic component 300 may also include a second path or block that includes a selection unit 320, a memory element 321, and a cryptographic logic 322. Each selection unit 310 and 320 may receive, as an input, a random number 330, an output 331 of the first cryptographic logic 312, an output 332 of the second cryptographic logic 322, and a control signal 323. Each memory element 311 and 321 may receive, as an input, the output of the corresponding selection unit (e.g., first selection unit output or second selection unit output) in its corresponding path. Furthermore, the output of the memory elements and may be received by a corresponding cryptographic logic 312 and 322.

In some embodiments, the selection units 310 and 320 may be, but are not limited to, multiplexers that may select one of several input signals and forwards the selected input signal as an output signal. Thus, the selection units 310 and 320 may select one of the three input signals as an output for a given time. The memory elements 311 and 321 may correspond to registers or flip-flops. Furthermore, the cryptographic logic 312 and 322 may perform logical operations corresponding to a cryptographic operation (e.g., AES).

In operation, when the cryptographic component 300 is to provide a DPA countermeasure (e.g., when the control signal 323 indicates a DPA countermeasure is needed), then each selection unit 310 and 320 may receive the same control signal 323 at the same value that identifies the need for a DPA countermeasure. In response, the selection unit 310 may alternate between selecting the random number 330 and the output 332 of the second cryptographic logic 322 as the first selection unit output and the selection unit 320 may select between the random number 330 and the output 331 of the first cryptographic logic 312 as the second selection unit output. In some embodiments, the random number 330 may be randomly generated for each clock cycle associated with the cryptographic component 300. For example, the random number 330 may be randomly generated each time that the selection unit 310 or 320 determines to select one of the inputs as an output signal.

Alternatively, if the cryptographic component 300 is not to provide the DPA countermeasure, then the selection unit 310 may select the output 331 of the first cryptographic logic 312 as the first selection unit output and the selection unit 320 may select the output 332 of the second cryptographic logic 322 as the second selection unit output.

Figure 4:
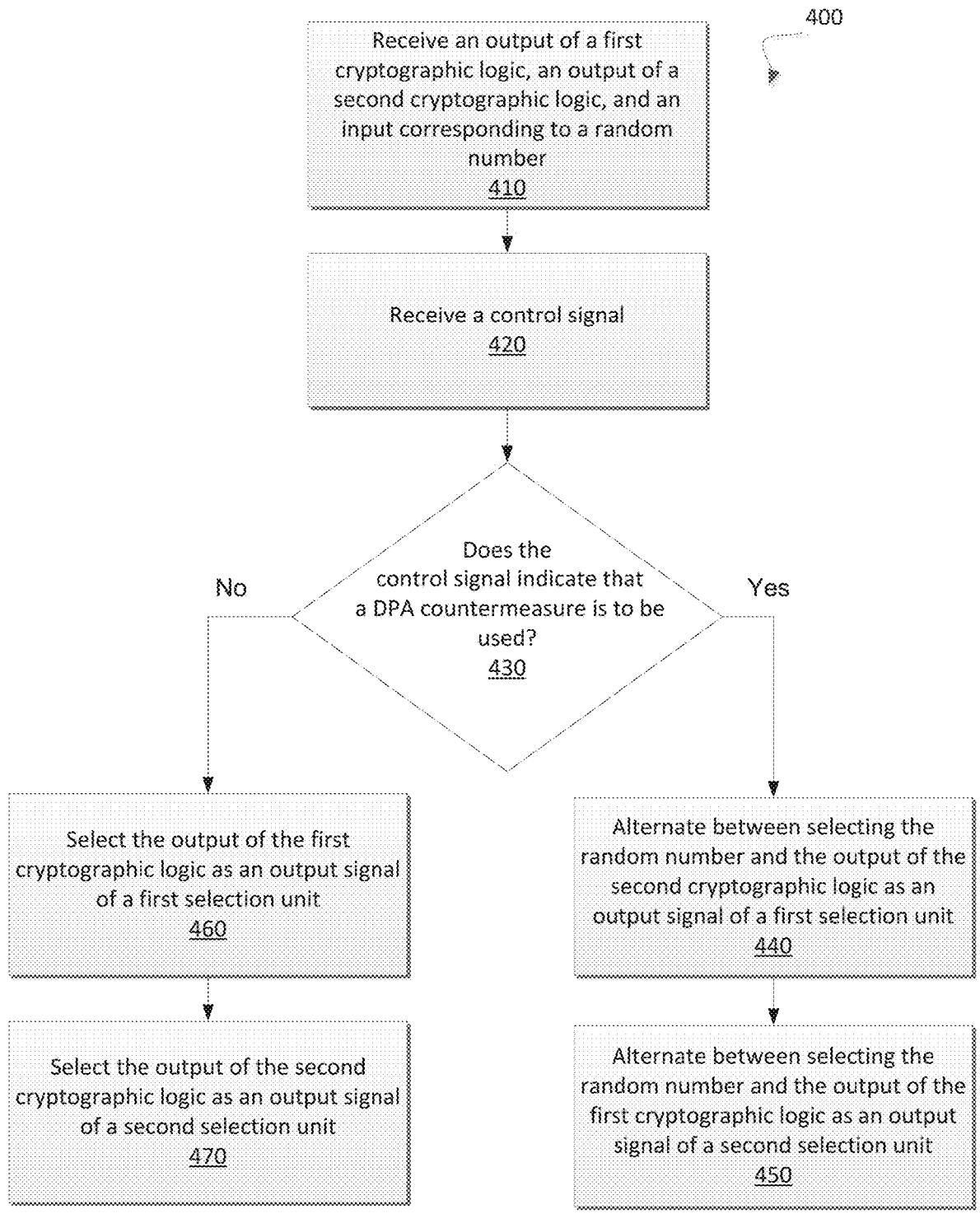
FIG. 4 is a flow diagram of an example method to select an input signal to be output based on a control signal in accordance with some embodiments.

FIG. 4 is a flow diagram of an example method 400 to select an input signal to be output based on a control signal. In general, the method 400 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 may be performed by the cryptographic component 120A or 120B of FIG. 1 or the cryptographic component 300 of FIG. 3. For example, the method 200 may be performed by a selection unit 310 and/or 320.

As shown in FIG. 4, the method 400 may begin with the processing logic receiving an input corresponding to an output of a first cryptographic logic, an input corresponding to an output of a second cryptographic logic, and an input corresponding to a random number from a random number generator (block 410). The processing logic may further receive a control signal (block 420). Furthermore, the processing logic may determine if the control signal specifies that a DPA countermeasure is to be used (block 430). If the control signal specifies that the DPA countermeasure is to be used, then the processing logic may alternate between selecting, as an output, between the random number and the input corresponding to the output of the second cryptographic logic at a first selection unit (block 440). Furthermore, the processing logic may alternate between selecting, as an output, between the same random number and the input corresponding to the output of the first cryptographic logic at a second selection unit (block 450). However, if the control signal specifies that the DPA countermeasure is not to be used, then the processing logic may select the input corresponding to the output of the first cryptographic logic as the output of the first selection unit (block 460). Additionally, the processing logic may select the input corresponding to the output of the second cryptographic logic as the output of the second selection unit (block 470).

The alternating between random number and the output of a cryptographic logic (e.g., of the other path) may involve the selection of the random number to be output by a selection unit in response to a first clock cycle and the selection of the output of the cryptographic logic to be output by the same selection unit in response to a second clock cycle subsequent to the first clock cycle (or vice versa). Thus, the alternating between input signals may correspond to outputting a first signal at a first time and then outputting a second signal at a second time after the first time.

Figure 5:
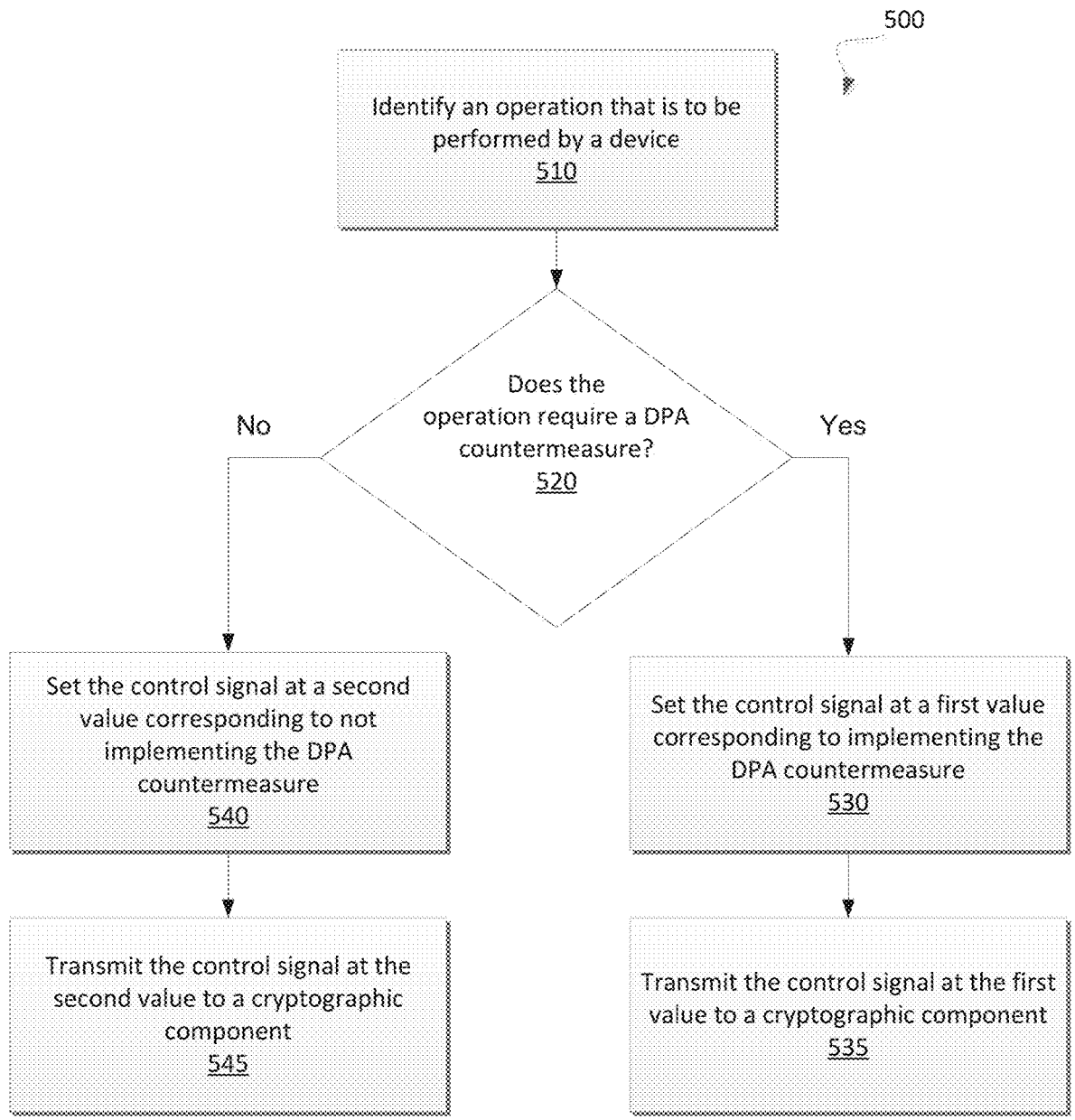
FIG. 5 is a flow diagram of an example method to generate a control signal based on a DPA countermeasure requirement in accordance with some embodiments.

FIG. 5 is a flow diagram of an example method 500 to generate a control signal based on a DPA countermeasure requirement. In general, the method 500 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 may be performed by the cryptographic component controller 110 of FIG. 1.

As shown in FIG. 5, the method 500 may begin with the processing logic identifying an operation or function that is to be performed by a device (block 510). For example, a device that includes multiple cryptographic components may perform multiple operations or functions where each operation or function may use one or more of the cryptographic components. For example, the device may include a first operation based on decoding a video where the video must be decoded with a DPA countermeasure (e.g., a specification for the operation that decodes the video requires a DPA countermeasure) while a second operation may not require a DPA countermeasure. The processing logic may determine if the operation requires a DPA countermeasure (block 520). If the operation to be performed by the device requires a DPA countermeasure, then the processing logic may set the control signal at a first value corresponding to implementing or providing a DPA countermeasure (block 530). Furthermore, the processing logic may transmit the control signal at the first value to a cryptographic component (block 535). For example, each selection unit of one cryptographic component may be configured based on the control signal set at the first value to provide the DPA countermeasure. However, if the operation to be performed by the device does not require the DPA countermeasure, then the processing logic may set the control signal at a second value corresponding to not implementing the DPA countermeasure (block 540). Furthermore, the processing logic may transmit the control signal at the second value to a cryptographic component (block 545). For example, each selection unit of one cryptographic component may be configured based on the control signal set at second first value to not provide the DPA countermeasure. Thus, the control signal may be set to different values based on whether or not the operation to be performed by a device is identified as needing a DPA countermeasure.

Figure 6:
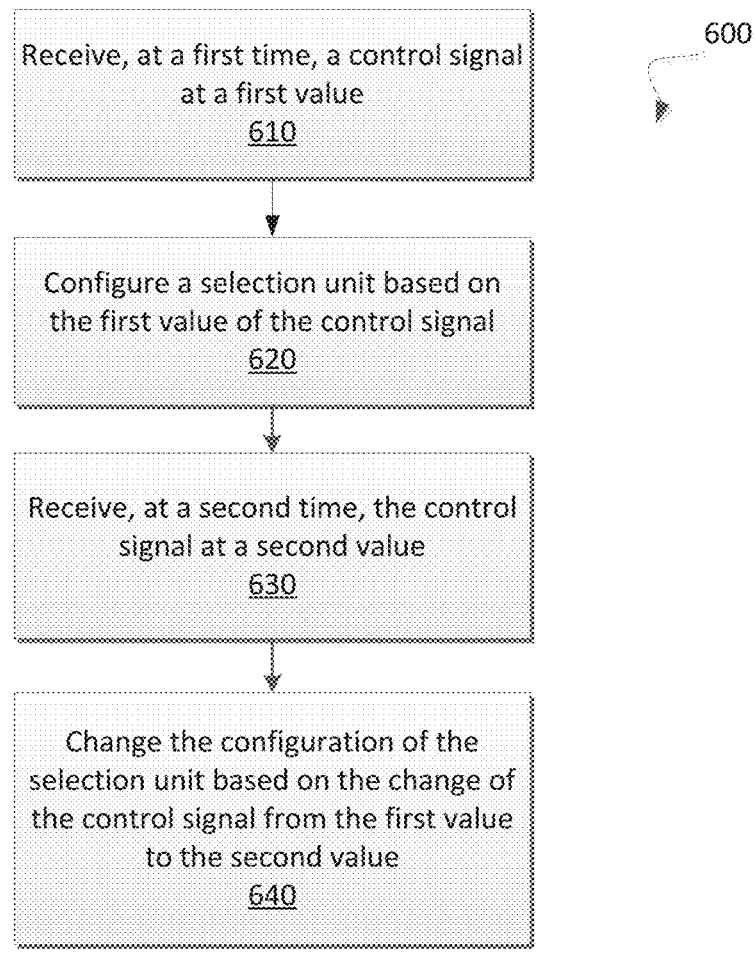
FIG. 6 is a flow diagram of an example method to change a configuration of a selection unit based on a control signal in accordance with some embodiments.

FIG. 6 is a flow diagram of an example method 600 to change a configuration of a selection unit based on a control signal. In general, the method 600 may be performed by processing logic that may comprise hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by the cryptographic component 120A or 120B of FIG. 1 or the cryptographic component 300 of FIG. 3. For example, the method 600 may be performed by a selection unit 310 and/or 320.

As shown in FIG. 6, the method 600 may begin with the processing logic receiving a control signal at a first value at a first time (block 610). For example, a selection unit may receive the control signal that identifies that a DPA countermeasure is to be used by an operation using a cryptographic component that includes the selection unit. The processing logic may subsequently configure a selection unit based on the first value of the control signal (block 620). At a second time which is subsequent to the first time, the processing logic may receive the control signal at a second value (block 630). For example, the control signal may be at the first value at a first time and at a second time the control signal may change from the first value to the second value that identifies that the DPA countermeasure is not to be used by a function using the cryptographic component that includes the selection unit. In response to the change in the control signal, the processing logic may change the configuration of the selection unit based on the control signal being at the second value (block 640). Thus, a selection unit may first be configured to provide a DPA countermeasure and may subsequently be configured to not provide the DPA countermeasure (or vice versa).

Figure 7:
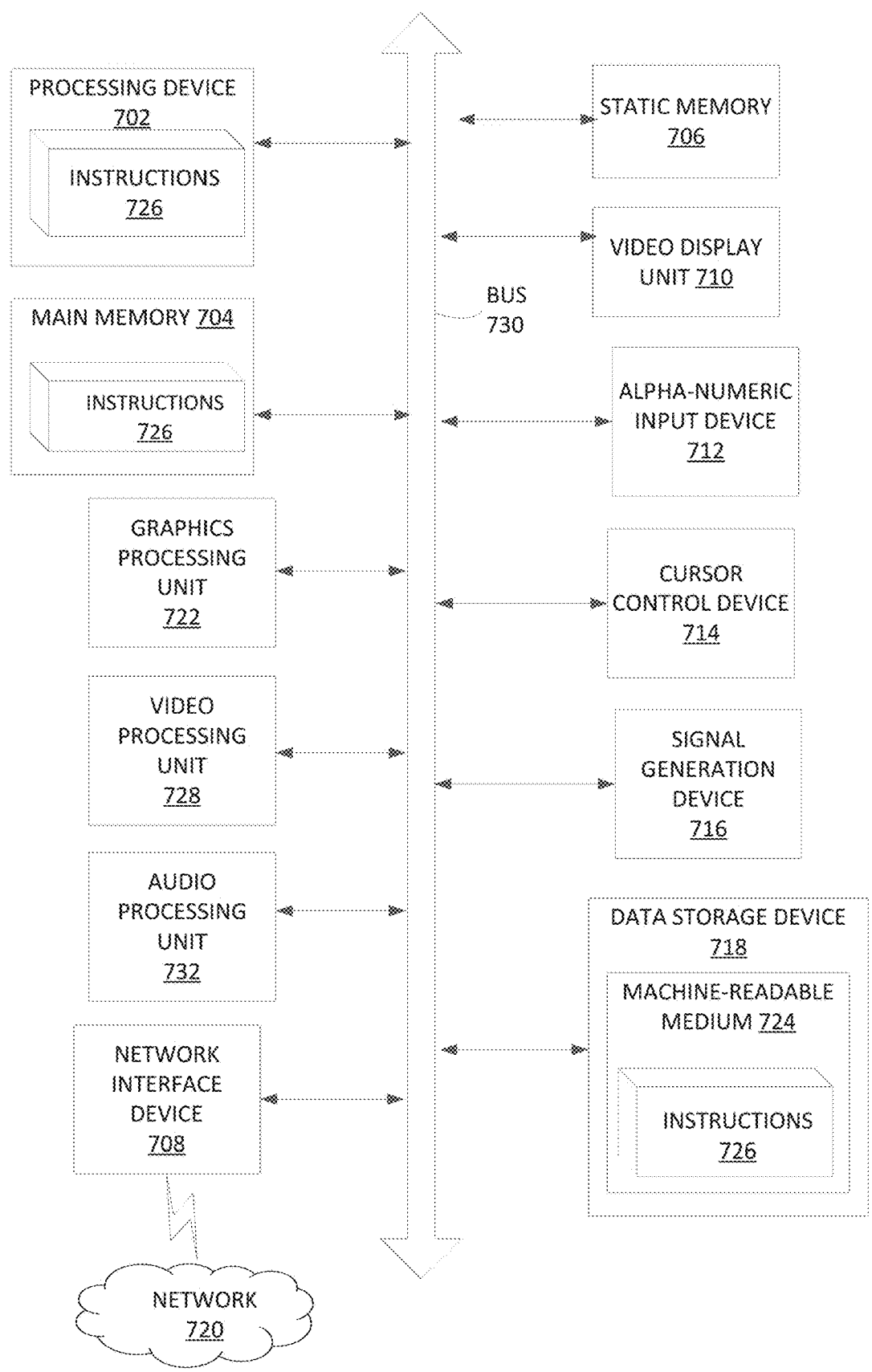
FIG. 7 illustrates a block diagram of an embodiment of a computer system in which some embodiments of the disclosure may operate.

FIG. 7 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 702 is configured to execute instructions 626 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), graphics processing unit 722, video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

In one implementation, the instructions 726 include instructions to implement functionality corresponding to a cryptographic component controller (e.g., cryptographic component controller 110 of FIG. 1). While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method comprising:
  receiving, by a cryptographic device, a plurality of input signals, the cryptographic device comprising a first cryptographic circuit and a second cryptographic circuit;
  determining, by the cryptographic device, whether a Differential Power Analysis (DPA) countermeasure is to be used for a cryptographic operation;
  responsive to a determination that the DPA countermeasure is to be used for the cryptographic operation:
    configuring the first cryptographic circuit and the second cryptographic circuit to collectively perform the cryptographic operation; and
    performing the cryptographic operation by the first cryptographic circuit and the second cryptographic circuit; and
  responsive to a determination that the DPA countermeasure is not to be used for the cryptographic operation:
    configuring the first cryptographic circuit to individually perform the cryptographic operation and configuring the second cryptographic circuit to individually perform a second cryptographic operation that is separate from the cryptographic operation;
performing the cryptographic operation by the first cryptographic circuit; and
performing the second cryptographic operation by the second cryptographic circuit.

2. The method of claim 1, wherein the first cryptographic circuit is a first Advanced Encryption Standard (AES) core and the second cryptographic circuit is a second AES core, wherein the DPA countermeasure is to be used in a first mode and not used in a second mode, wherein performing the cryptographic operation in the first mode comprises processing a secret key or message data interleaved with random pre-charged data by synchronously selecting between first inputs of a multiplexer, and wherein performing the cryptographic operation in the second mode comprises processing a secret key or message data by statically selecting second inputs of the multiplexer.

3. The method of claim 1, further comprising:
receiving a control signal indicating whether to use the DPA countermeasure for the cryptographic operation, wherein the control signal is indicative of a number of cryptographic operations that are to be performed by the first cryptographic circuit and the second cryptographic circuit, and wherein the control signal indicates whether the first cryptographic circuit is to collectively perform the cryptographic operation in conjunction with the second cryptographic circuit or whether the first cryptographic circuit is to individually perform the cryptographic operation and the second cryptographic circuit is to individually perform the second cryptographic operation.

4. The method of claim 3, wherein the control signal is received by a first selection circuit and a second selection circuit, and wherein each of the first selection circuit and the second selection circuit is configured to transmit one of the plurality of input signals based on the control signal.

5. The method of claim 1, wherein performing the cryptographic operation by the first cryptographic circuit and the second cryptographic circuit comprises switching between a first input signal from the plurality of input signals and a second input signal, from the plurality of input signals, that is associated with the DPA countermeasure.

6. The method of claim 1, wherein:
performing the cryptographic operation by the first cryptographic circuit comprises performing the cryptographic operation using a first input signal from the plurality of input signals and without using a second input signal from the plurality of input signals; and
performing the second cryptographic operation by the second cryptographic circuit comprises performing the second cryptographic operation using the second input signal from the plurality of input signals.

7. The method of claim 1, wherein performing the cryptographic operation by the first cryptographic circuit and the second cryptographic circuit comprises
transmitting, from the first cryptographic circuit, a first output signal based on alternating a selection between a second output signal of the second cryptographic circuit and a second input signal that is associated with the DPA countermeasure; and
transmitting, from the second cryptographic circuit, the second output signal based on alternating a selection between the first output signal of the first cryptographic circuit and the second input signal that is associated with the DPA countermeasure.

8. The method of claim 7, wherein the second input signal that is associated with the DPA countermeasure corresponds to a randomly generated number.

9. The method of claim 1, wherein:
performing the cryptographic operation by the first cryptographic circuit comprises transmitting, from the first cryptographic circuit, a first output signal based on a selection of an output of the first cryptographic circuit; and
performing the second cryptographic operation by the second cryptographic circuit comprises transmitting, from the second cryptographic circuit, a second output signal based on a selection of another output of the second cryptographic circuit.

10. The method of claim 1, wherein:
performing the cryptographic operation by the first cryptographic circuit and the second cryptographic circuit comprises performing the cryptographic operation as a round of a block cipher operation; and
performing the cryptographic operation by the first cryptographic circuit comprises performing the cryptographic operation as a first round of the block cipher operation; and
performing the second cryptographic operation by the second cryptographic circuit comprises performing the second cryptographic operation as a second round of the block cipher operation.

11. The method of claim 1, wherein the cryptographic operation corresponds to a round of an Advanced Encryption Standard (AES) operation.

12. An integrated circuit comprising:
a controller;
selection circuitry coupled to the controller, the selection circuitry to receive a plurality of input signals;
a first cryptographic circuit coupled to the selection circuitry;
a second cryptographic circuit coupled to the selection circuitry, wherein:
the controller is to determine whether a Differential Power Analysis (DPA) countermeasure is to be used for a cryptographic operation;
responsive to a determination that the DPA countermeasure is to be used for the cryptographic operation:
the controller is to configure the first cryptographic circuit and the second cryptographic circuit to collectively perform the cryptographic operation; and
the first cryptographic circuit and the second cryptographic circuit are to perform the cryptographic operation; and
responsive to a determination that the DPA countermeasure is not to be used for the cryptographic operation:
the controller is to configure the first cryptographic circuit to individually perform the cryptographic operation and configure the second cryptographic circuit to individually perform a second cryptographic operation that is separate from the cryptographic operation;
the first cryptographic circuit is to perform the cryptographic operation by the first cryptographic circuit; and
the second cryptographic circuit is to perform the second cryptographic operation by the second cryptographic circuit.

13. The integrated circuit of claim 12, wherein the selection circuitry is to:
   receive a control signal from the controller, the control signal indicating when the DPA countermeasure is to be implemented by the integrated circuit for the cryptographic operation, and wherein the control signal indicates whether the first cryptographic circuit is to collectively perform the cryptographic operation in conjunction with the second cryptographic circuit or whether the first cryptographic circuit is to individually perform the cryptographic operation and the second cryptographic circuit is to individually perform the second cryptographic operation; and
   output one of the plurality of input signals based on the control signal.

14. The integrated circuit of claim 13, wherein the plurality of input signals comprises a first input signal, a second input signal, and a third input signal, and wherein the selection circuitry is to:
   select the first input signal as the output of the selection circuitry when the control signal indicates that the DPA countermeasure is not to be implemented; and
   alternate a selection between the second input signal and the third input signal when the control signal indicates that the DPA countermeasure is to be implemented.

15. The integrated circuit of claim 14, wherein the selection circuitry is to alternate the selection between the second input signal and the third input signal by selecting the second input signal as the output of the selection circuitry in response to a first round of the cryptographic operation and selecting the third input signal as the output of the selection circuitry in response to a second round of the cryptographic operation subsequent to the first round.

16. The integrated circuit of claim 14, wherein the first input signal is an output of the first cryptographic circuit, the second input signal is an output of the second cryptographic circuit, and the third input signal is a randomly generated number.

17. The integrated circuit of claim 12, further comprising a random number generator coupled to the selection circuitry, the random number generator to generate a randomly generated number in response to each round of a block cipher operation.

18. The integrated circuit of claim 12, wherein the selection circuitry comprises a first multiplexer and a second multiplexer.

19. A system on a chip (SoC) comprising:
a controller;
a first cryptographic circuit coupled to the controller; and
a second cryptographic circuit coupled to the controller, wherein:
   the controller is to:
      determine whether a Differential Power Analysis (DPA) countermeasure is to be used for a cryptographic operation; and
      generate a control signal indicating when the DPA countermeasure is to be used for the cryptographic operation, wherein the control signal is indicative of a number of cryptographic operations that are to be performed, and wherein the control signal indicates whether the first cryptographic circuit and the second cryptographic circuit are to collectively perform the cryptographic operation or whether the first cryptographic circuit is to individually perform the cryptographic operation and the second cryptographic circuit to individually perform a second cryptographic operation that is separate from the cryptographic operation;
   the first cryptographic circuit and the second cryptographic circuit are to collectively perform the cryptographic operation responsive to a determination that the DPA countermeasure is to be used for the cryptographic operation;
   the first cryptographic circuit is to individually perform the cryptographic operation responsive to a determination that the DPA countermeasure is not to be used for the cryptographic operation; and
   the second cryptographic circuit is to individually perform the second cryptographic operation responsive to a determination that the DPA countermeasure is not to be used for the cryptographic operation.

20. The SoC of claim 19, further comprising:
a first multiplexer coupled to the first cryptographic circuit and the second cryptographic circuit
a second multiplexer coupled to the second cryptographic circuit and the first cryptographic circuit; and
a random number generator coupled to the first multiplexer and the second multiplexer.

* * * * *